(12) United States Patent
Hagerty

(10) Patent No.: US 11,057,388 B2
(45) Date of Patent: Jul. 6, 2021

(54) METHOD AND COMPUTER PROGRAM PRODUCT FOR CREATING ENTERPRISE MANAGEMENT SYSTEMS

(71) Applicant: Craig Technical Consulting, Inc., Merritt Island, FL (US)

(72) Inventor: Timothy Hagerty, Cocoa Beach, FL (US)

(73) Assignee: Craig Technical Consulting, Inc., Merritt Island, FL (US)

( * ) Notice: Subject to any disclaimer, the term of this patent is extended or adjusted under 35 U.S.C. 154(b) by 310 days.

(21) Appl. No.: 15/149,630

(22) Filed: May 9, 2016

(65) Prior Publication Data

US 2016/0328217 A1 Nov. 10, 2016

Related U.S. Application Data

(60) Provisional application No. 62/158,871, filed on May 8, 2015.

(51) Int. Cl.
*H04L 29/06* (2006.01)
*G06Q 10/06* (2012.01)

(52) U.S. Cl.
CPC ........... *H04L 63/102* (2013.01); *G06Q 10/06* (2013.01)

(58) Field of Classification Search
CPC .............................. H04L 63/102; G06Q 10/06
See application file for complete search history.

(56) References Cited

U.S. PATENT DOCUMENTS

| 7,051,036 B2 | 5/2006 | Rosnow et al. |
| 7,836,103 B2 | 11/2010 | Li et al. |
| 8,443,036 B2 | 5/2013 | Li et al. |
| 2007/0156731 A1 | 7/2007 | Ben-Zeev |
| 2008/0163164 A1* | 7/2008 | Chowdhary ............. G06F 8/35 717/106 |
| 2008/0209078 A1* | 8/2008 | Bates ..................... G06Q 10/00 710/10 |
| 2011/0276503 A1* | 11/2011 | Whittington ......... G06Q 30/018 705/317 |

(Continued)

*Primary Examiner* — Doon Y Chow
*Assistant Examiner* — Timothy P Duncan
(74) *Attorney, Agent, or Firm* — Mark Malek; Kelly G. Swartz; Widerman Malek, PL

(57) ABSTRACT

A computer program product for creating an enterprise management dashboard program, and comprising a process architecture server, a process architect client, a stakeholder client, and/or a process object server. The process architecture server includes a compiler characterized by an access control subsystem (receives role-base access control definition data), a work flow modeling subsystem (receives process model definition data), a data management subsystem (receives data structure definition data), a communication subsystem (receives communication protocol definition data), and a report management subsystem (receives report content definition data). The compiler uses the aforementioned data to create executable computer code for the enterprise management dashboard program based on modeling constructs including project sites, task pages, interface templates, report templates, and/or third-party process content. The resultant enterprise management dashboard program may be used to create and save process objects such as projects, tasks, artifacts (e.g., digital files), and process metrics.

13 Claims, 14 Drawing Sheets

(56) References Cited

U.S. PATENT DOCUMENTS

| | | | | |
|---|---|---|---|---|
| 2012/0041885 A1* | 2/2012 | Parker | ................... | G06Q 50/18 |
| | | | | 705/313 |
| 2012/0224057 A1* | 9/2012 | Gill | ....................... | G06F 21/55 |
| | | | | 348/143 |
| 2013/0090960 A1* | 4/2013 | Portier | ............... | G06Q 10/0633 |
| | | | | 705/7.11 |
| 2013/0304530 A1* | 11/2013 | Chodavarapu | ..... | G06Q 10/0639 |
| | | | | 705/7.11 |
| 2014/0019187 A1 | 1/2014 | Olsen et al. | | |
| 2015/0193630 A1* | 7/2015 | Von Kaenel | ........... | G06Q 40/08 |
| | | | | 707/785 |
| 2016/0050213 A1* | 2/2016 | Storr | ................... | H04L 63/0861 |
| | | | | 726/6 |

\* cited by examiner

METHOD AND COMPUTER PROGRAM PRODUCT FOR CREATING ENTERPRISE MANAGEMENT SYSTEMS

RELATED APPLICATIONS

This application claims the benefit under 35 U.S.C. § 119(e) of U.S. Provisional Patent Application Ser. No. 62/158,871 filed on May 8, 2015 and titled Method and Computer Program Product for Creating Enterprise Management Systems, the entire content of which is incorporated herein by reference.

FIELD OF THE INVENTION

The present invention relates to the field of computer program generation and, more specifically, to methods and a computer program product for creating automated enterprise management systems.

BACKGROUND OF THE INVENTION

An enterprise may be defined as a project or activity that involves many people (for example, a business or company) and that is difficult or requires effort. Enterprise architecture is the practice of building a holistic view of an enterprise's strategy, processes, information, and information technology assets. As strategies, processes, information, and technologies evolve, often independently of each other, maintaining an enterprise architecture that effectively supports a project's workforce can be a recurring challenge.

An automated business process within an enterprise may be defined as a flow sequence of operations performed using a single or set of systems or applications. This flow sequence may be composed of user interactions with screens of the system in which the user may, for example, verify fields of information for valid content, take note of certain fields for later processing, enter new information or update existing fields, and navigate between screens.

As an enterprise grows larger, creating, using, and maintaining automated business processes may become complex. For example, some business processes may involve systems or applications that were not designed with optimization of operator work in mind. Also for example, some business processes may involve a combination of systems which were not designed to interact and work together. Consequently, automated business process implementations often involve many operations possibly on different screens and/or in different systems, and hence can be cumbersome and error prone to use.

What is needed is a product that is capable of collecting enterprise management design and implementation input from a process architect and then automatically generating a tailorable enterprise management system that may be used to facilitate execution of the architect-specified business process. Such a system would be capable of performing the repetitive steps involved with building a suitable enterprise management system, allowing a layman user to quickly create the required process without engaging a specially-skilled programmer. The resulting code could be modified and customized as required. For a project-based team, such a computer program product could permit a layman to perform the task of generating an enterprise management system for nearly any type of human-centric enterprise This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a computer program product for creating an enterprise management dashboard program. The computer program product comprises some combination of a process architecture server, a process architect client, a stakeholder client, and/or a process object server. The process architecture server includes a processor, a data store, and a compiler comprising an access control subsystem, a work flow modeling subsystem, a data management subsystem, a communication subsystem, and a report management subsystem. Each of the plurality of subsystems comprises a respective interface to manipulate information included in the data store.

The access control subsystem receives role-base access control definition data. The work flow modeling subsystem receives process model definition data. The data management subsystem receives data structure definition data. The communication subsystem receives communication protocol definition data. The report management subsystem receives report content definition data. The data store stores each of the aforementioned data, which the compiler then uses to create executable computer code for the enterprise management dashboard program.

The access control subsystem receives a computer program product access request, matches the request to role-base access control definition data that includes a process architect registration and/or a stakeholder registration, and operates the compiler to enforce role-based system access to the other compiler subsystems.

The work flow modeling subsystem creates and saves an enterprise management system model comprising some number of project sites and a task pages associated with each project site. Enterprise management system model creation is facilitated by the work flow modeling subsystem's presentation of interface templates, report templates, and/or third-party process content received from the process object server. A stakeholder uses the stakeholder client to operate the enterprise management dashboard program to create and save process objects such as a project, a task, an artifact (e.g., digital file), and a stakeholder. In the background, the enterprise management dashboard program optionally collects process metrics related to manipulation of the process objects.

DETAILED DESCRIPTION OF THE INVENTION

Figure 1:
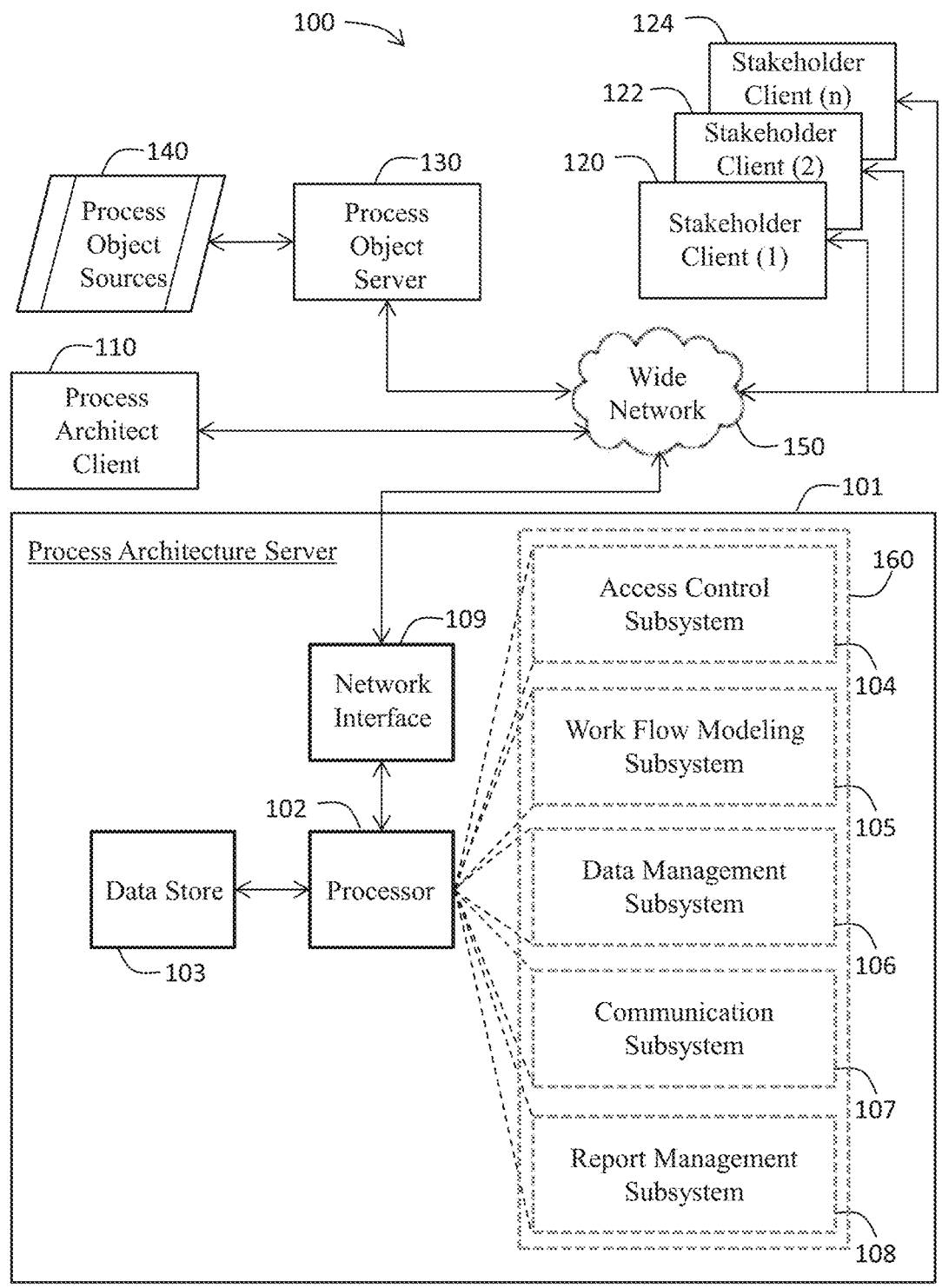
FIG. 1 is a schematic block diagram of an enterprise management creation system (EMCS) according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides an enterprise management creation system (EMCS) according to an embodiment of the present invention is now described in detail. Throughout this disclosure, the present invention may be referred to as an enterprise automation system, an enterprise architecture system, a process design system, a computer-based process definition system, a design system, a development system, a computer program product, a computer program, a product, a system, a device, and a method. Furthermore, the present invention may be referred to as relating to the implementation of a process automation solution for modeling an enterprise. Those skilled in the art will appreciate that this terminology does not affect the scope of the invention. For instance, the present invention may just as easily relate to the implementation of work flows, project plans, and dependency modeling systems.

Referring to FIGS. 1-12, example methods and systems for an enterprise management creation system (EMCS) are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation. Some of the illustrative aspects of the present invention may be advantageous in solving the problems herein described and other problems not discussed which are discoverable by a skilled artisan.

Referring now to FIG. 1, the EMCS 100 according to an embodiment of the present invention will now be discussed in greater detail. An embodiment of the invention, as shown and described by the various figures and accompanying text, provides an EMCS 100 that may implement an automated method of creating and maintaining automation that facilitates a complex enterprise management process. For example, and without limitation, the EMCS 100, according to an embodiment of the present invention, may include a Process Architecture Server 101, which may be in data communication with a Process Architect Client 110, a Stakeholder Client 120, and a Process Object server 130. For example, and without limitation, the Process Object Server 130 may be a third-party server such as a government contract management system, and or an Internal Revenue Service (IRS) content server. The Process Architect Client 110, Stakeholder Client 120, and Process Object Server 130 each may be coupled to the Process Architecture Server 101 using a wide area network 150 such as the Internet. The Process Architecture Server 101 also may be in data communication with various third-party Process Object Sources 140 through the Process Object Server 130 and/or through the Internet 150 directly.

For example, and without limitation, either of the Process Architect Client 110 and the Stakeholder Client 120 may comprise a web browser and a communication application. "Web browser" as used herein includes, but is not limited to, any application software or program (including mobile applications) designed to enable users to access online resources and conduct trusted transactions over a wide network such as the Internet. "Communication" as used herein includes, but is not limited to, electronic mail (email), instant messaging, mobile applications, personal digital assistant (PDA), a pager, a fax, a cellular telephone, a conventional telephone, television, video telephone conferencing display, other types of radio wave transmitter/transponders and other forms of electronic communication. For example, and without limitation, the Process Architect Client 110 and the Stakeholder Client 120 may be configured to execute web applications designed to function on any cross-platform web server running Apache, MySQL, and PHP.

Those skilled in the art will recognize that other forms of communication known in the art are within the spirit and scope of the present invention.

A typical user of a Process Architect Client 110 may be a contributor to the process of creating and deploying business process automation. Such a user may interact with various servers included in the EMCS 100 through the Process Architect Client 110. For example, and without limitation, EMCS 100 users may include subject matter experts in an enterprise of interest. Such a subject matter expert may use the Process Architect Client 110 to model and generate a comprehensive, automated "dashboard" environment for facilitating and monitoring an end-to-end business enterprise. A dashboard may be defined herein as a data visualization tool that receives and delivers process artifacts, and, coincidentally, detects and displays the current status of metrics and key performance indicators (KPIs) for an enterprise. Also for example, and without limitation, EMCS 100 users may include process architects tasked with structuring, creating, and deploying process automation tools that may include project-based environments.

Continuing to refer to FIG. 1, the Process Architecture Server 101 may comprise a processor 102 that may accept and execute computerized instructions, and also a data store 103 which may store data and instructions used by the processor 102. More specifically, the processor 102 may be configured in data communication with a Process Architect Client 110, some number of Stakeholder Clients 120, 122, 124, a Process Object Server 130, and Process Object Sources 140. The processor 102 may be configured to direct input from other components of the EMCS 100 to the data store 103 for storage and subsequent retrieval.

For example, and without limitation, the processor 102 may be in data communication with external computing resources 110, 120, 122, 124, 130, 140 through a direct connection and/or through a network connection 150 facilitated by a network interface 109. Access Control Subsystem 104 instructions, Work Flow Modeling Subsystem 105 instructions, Data Management Subsystem 106 instructions, Communication Subsystem 107 instructions, and Report Management Subsystem 108 instructions may be stored in the data store 103 and retrieved by the processor 102 for execution. The Access Control Subsystem 104 instructions, Work Flow Modeling Subsystem 105 instructions, Data Management Subsystem 106 instructions, Communication Subsystem 107 instructions, and Report Management Subsystem 108 instructions may be collectively referred to herein as a compiler 160. Although the data store 103 of FIG. 1 is shown as local storage, a skilled artisan will recognize that the data store 103 may alternatively, or in addition, comprise one or both of server-based storage and cloud storage.

The Access Control Subsystem 104, according to embodiments of the present invention, may be configured to advantageously create and enforce role-based access to data and functions related to generated enterprise dashboard designs.

The Work Flow Modeling Subsystem 446105, according to embodiments of the present invention, may be configured to advantageously model processes within a generated system, including definition of tasks, responsible parties, execution timelines, and project milestones. The Work Flow Modeling Subsystem 105 may also be used to advantageously define process metrics to be collected during execution of a work flow modeled in a generated system.

The Data Management Subsystem 106, according to embodiments of the present invention, may be configured to advantageously define data input sources and data output destinations to be accessed by a generated system, including electronic file upload and export.

The Communication Subsystem 107, according to embodiments of the present invention, may be configured to advantageously define protocols for communication among users (e.g., stakeholders) privileged to access a generated system, as well as between the users and the generated system itself (e.g., alerts). The Communication Subsystem 107 may also be used to advantageously define means for users to interact with the generated system in a trusted manner (e.g., e-signature), as well as to specify data security mechanisms (e.g., encryption).

The Report Management Subsystem 108, according to embodiments of the present invention, may be configured to advantageously define format and content for reports created and published by a generated system, including status tracking for modeled processes.

Exemplary operations of the Access Control Subsystem 104, the Work Flow Modeling Subsystem 105, the Data Management Subsystem 106, the Communication Subsystem 107, and the Report Management Subsystem 108 are described individually in greater detail below. Those skilled in the art will appreciate, however, that the present invention contemplates the use of computer instructions that may perform any or all of the operations involved in enterprise systems design, including version control, content searching, customer records administration, and product delivery. The disclosure of computer instructions that include Access Control Subsystem 104 instructions, Work Flow Modeling Subsystem 105 instructions, Data Management Subsystem 106 instructions, Communication Subsystem 107 instructions, and Report Management Subsystem 108 instructions is not meant to be limiting in any way. Those skilled in the art will readily appreciate that stored computer instructions may be configured in any way while still accomplishing the many goals, features and advantages according to the present invention.

The Process Architecture Server 101 also may be in data communication with third-party software applications designed to support less than a complete enterprise-wide automated solution. For example, and without limitation, the EMCS 100 may provide the capability to create an enterprise dashboard that incorporates content retrieved from a Process Object Server 130 that is configured to execute SharePoint®, which is a proprietary collaboration environment that allows users to create and share content that can be delivered on the web. Also for example, and without limitation, the EMCS 100 may provide the capability to create an enterprise dashboard that incorporates content retrieved from Process Object Server 130 that is configured to execute Microsoft Project®, which is a proprietary project management software program designed to assist a project manager in developing a plan, assigning resources to tasks, tracking progress, managing a project budget, and analyzing workloads. For example, and without limitation, the Process Object Server 130 may comprise a web host configured for cloud computing.

Figure 1A:
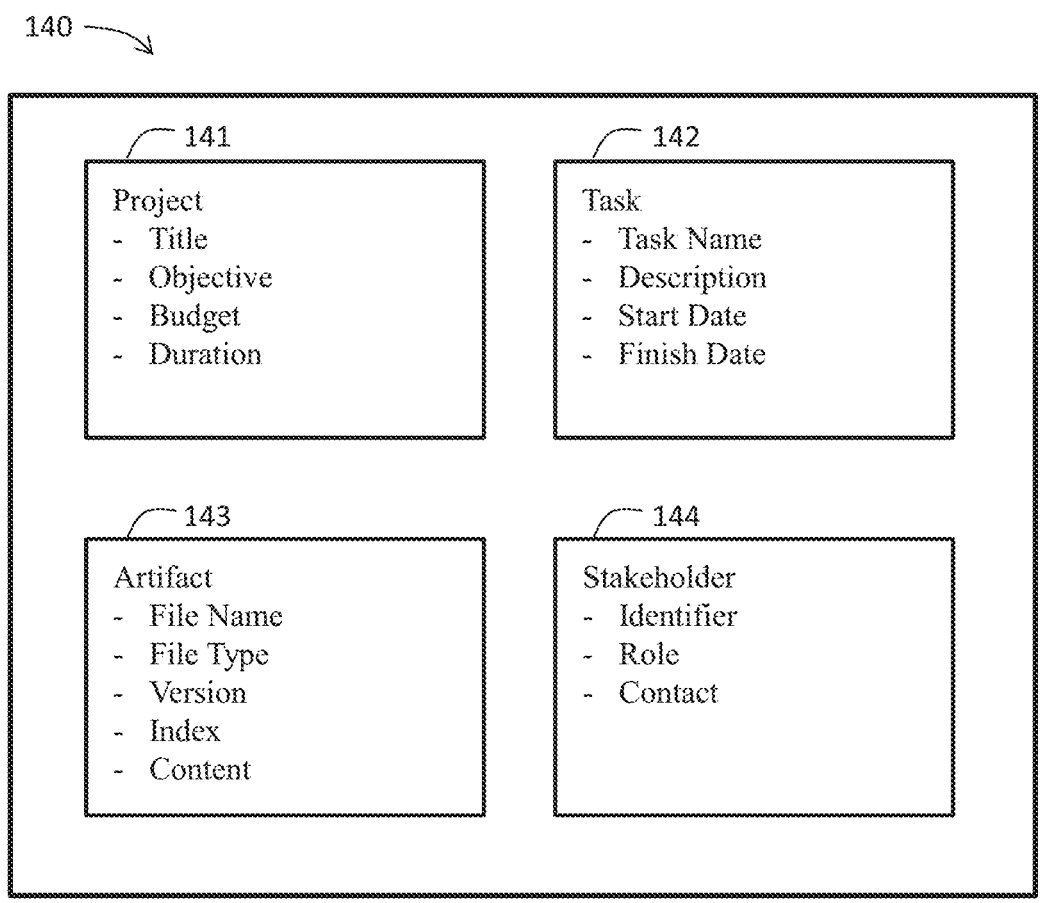
FIG. 1A is a diagram illustrating exemplary data structures of the EMCS depicted in FIG. 1.

Continuing to refer to FIG. 1, and referring additionally to FIG. 1A, the Process Architecture Server 101 may retrieve process objects, and may write to the data store 103 the digital content files representing those objects. For example, and without limitation, the Process Object Server 130 may process a request from one or more of the compiler 160 subsystems 104, 105, 106, 107, 108 of the EMCS 100 to download a copy of a particular process object 140. The embodiment of third-party process object sources 140 illustrated in FIG. 1A shows example structures of process objects that may be included in a particular data delivery. Employment of networking may permit the compiler 160 subsystems 104, 105, 106, 107, 108 of the EMCS 100 to retrieve objects from third-party process object sources 140, thereby enhancing the timeliness and completeness of data used by the system 100. Although the embodiment of the invention discussed herein describes the process object creation, modification, and adornment functionality performed by the subsystems 104, 105, 106, 107, 108 of the EMCS 100 as illustrated in FIG. 1, those skilled in the art will readily appreciate that stored computer instructions may be configured in any way while still accomplishing the many goals, features and advantages according to the present invention.

Continuing to refer to FIG. 1A, for example, and without limitation, the data structure for a project 141 will now be discussed. A project 141 may be defined as an individual or collaborative endeavor that is planned and executed to achieve a particular aim. A process object for a project 141 may comprise a project title, a summary of the project objective, a resource budget for the project, and a duration of execution for the project. For example, and without limitation, the resource budget for a project 141 may be expressed in terms of money and/or human resources.

Continuing to refer to FIG. 1A, for example, and without limitation, the data structure for a task 142 will now be discussed. A task 142 may be defined as a discreet activity designed to contribute to accomplishment of a particular objective. A task 142 may be time-sensitive, meaning that it may be executed within a defined period of time or by a deadline. The process object for a task 142 may include a task name, a summary description of the activity to be carried out, and defined start and end dates for the activity.

Continuing to refer to FIG. 1A, for example, and without limitation, the data structure for an artifact 143 will now be discussed. The term "artifact" 143 may generically refer to any project instrument that may serve as either input to (e.g., a procurement contract, a tax form) or output of (e.g., contract deliverable, completed tax return) a given activity. The process object for an artifact 143 may comprise a digital file that may be characterized by a file name, a file type, and a version identifier. For example, and without limitation, an artifact 143 may comprise a digital file that includes directly-actionable content. Also for example, and without limitation, an artifact 143 may comprise an index that does not include directly-actionable content, but instead that references the location of a digital file that includes directly-actionable content.

Continuing to refer to FIG. 1A, for example, and without limitation, the data structure for stakeholder 144 will now be discussed. A stakeholder 144 may be defined as a person or entity that has an interest in a given activity. For example, and without limitation, a stakeholder 144 may be a project sponsor a project, may stand to gain upon a successful completion of a project, and or may be in a position to have a positive and/or negative influence in the project completion. The process object for a stakeholder 144 may include a unique identifier for the stakeholder, an indicator of the stakeholder's role in the subject project, and an identification handle for making contact with the stakeholder for the duration of a project.

Those skilled in the art will appreciate that the present invention contemplates the use of data structures that may store information supporting any or all of the operations involved in delivering enterprise management support. The disclosure of the exemplary data structures above is not meant to be limiting in any way. Those skilled in the art will readily appreciate that data structures may include any number of additional or alternative data sources, and may be configured in any way while still accomplishing the many goals, features and advantages according to the present invention.

Figure 2:
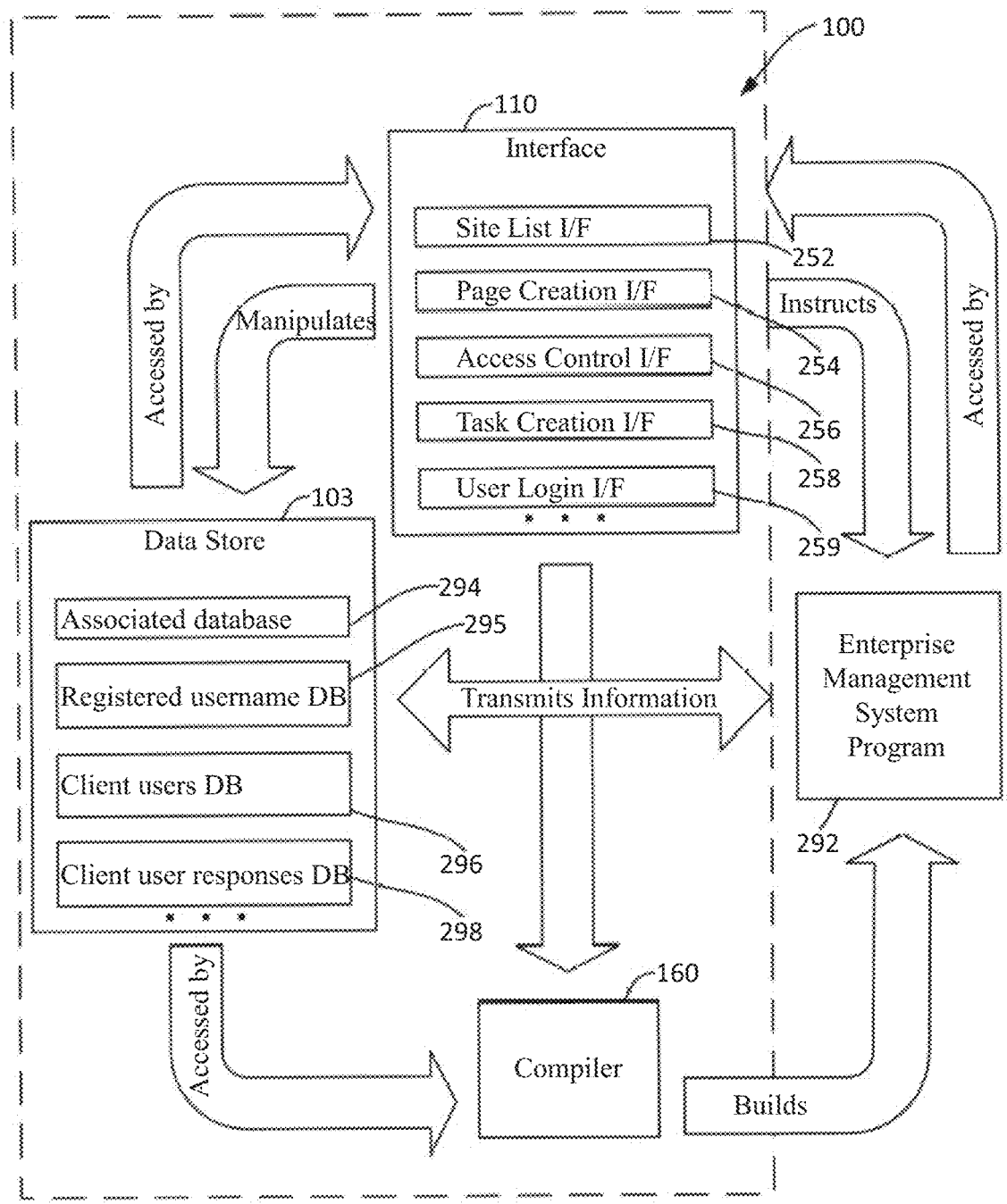
FIG. 2 is a block diagram of a computer program product according to an embodiment of the present invention.

Referring now to FIG. 2, a computer program product 100 that may be used to create an enterprise management system program 292, and the operation thereof, will now be discussed. The computer program product 100 may generally include an interface 110, a data store 103, and a compiler 160. A person of skill in the art will appreciate that use of the term "data store" within this disclosure is intended to encompass multiple databases, and is used generally to refer to a data structure that may store data or information.

The computer program product 100, according to an embodiment of the present invention, may be capable of presenting an interface 110 to a user (sometimes referred to throughout this disclosure as a process architect). The interface 110 may be designed to collect information required to build a desired enterprise management system program 292. For example, and without limitation, the interface 110 may be capable of collecting design information regarding project tasks to be completed (or presented through an interface to a stakeholder user), project artifacts to be created, and project communications among stakeholders. Also for example, and without limitation, the interface 110 may present various reports that may be defined by a process architect and/or a stakeholder.

The interface 110 may allow a process architect to manipulate the information included in the data store 103, which may be accessed using the interface 110. Additionally, the interface 110 may be used to instruct the compiler 160 to build an enterprise management system program 292. Furthermore, the interface 110 may be used to instruct and interact with the created enterprise management system program 292, allowing the information generated using the enterprise management system program 292 to be accessed using the interface 110. A person of skill in the art will appreciate that additional interfaces 110 may be used to access and interact with the enterprise management system program 292. For example, and without limitation, the one or more interfaces 110 may be connected remotely over a network to the created enterprise management system program 292.

The interface 110 may include one or more subset interfaces, through each of which a process architect may manipulate the information included in the data store 103. For example, the interface 110 may include a site list interface 252, a page creation interface 254, an access control interface 256, a task creation interface 258, a user login interface 259, and/or any number of additional interfaces through which the computer program product 100 may be interacted. Also, any of the aforementioned subset interfaces may include additional interfaces through which a user may interact with the computer program product 100, according to an embodiment of the present invention. The function of the aforementioned interfaces will be further discussed below.

In addition to interoperation with the interface 110, the data store 103 may communicate with the compiler 160 and the enterprise management system program 292, as well as with other components. The data store 103 may include the information used to build the enterprise management system program 292, which may be accessed by the compiler 160. The data store 103 may additionally be used to transmit information between itself and one or more enterprise management system programs 292. However, a person of skill in the art will appreciate that the enterprise management system program 292 may include its own database, or may be connected to any number of databases which, for example, and without limitation, may be connected remotely over a network to the enterprise management system program 292.

The data store 103 may include one or more subset databases, which may include information that may be manipulated by a user, such as a process architect. The data store 103 may additionally include code, data tables, templates, and other data that may be used by the compiler 160 to build the resulting enterprise management system program 292. For example, the data store 103 may include an associated database 294, a database of registered user names 295, a database of stakeholders 296, a stakeholder action update database 298, and any number of additional databases. The aforementioned subset databases will be further discussed below.

The compiler 160 may be operated to build the enterprise management system program 292. The building operation may be initiated by a process architect using the interface 110. The compiler 160 may also access templates and/or code included in the data store 103. The compiler 160 may use the templates and code to build the resulting enterprise management system program 292.

When building of the enterprise management system program 292 is complete, the program 292 may present one or more work flow tasks to a stakeholder to prompt action. For example, and without limitation, the enterprise management system program 292 may be accessed and interacted with through the interface 110. Also for example, and without limitation, the enterprise management system program 292 may be accessed by a remotely connected interface, which may not be included in the computer program product 100 of the present invention.

As the enterprise management system program 292 may be interacted with by a stakeholder, the program 292 may generate a dashboard of information for display and/or interaction. Such information may include, for example, digital files uploaded to the enterprise management system program 292 by a stakeholder in satisfaction of a task assigned to that stakeholder. This information may be transmitted between the enterprise management system program 292 and a database, such as the data store 103 included in the computer program product 100 of the present invention. However, a person of skill in the art will appreciate that additional databases may be used as a data source and/or data destination within the enterprise management system program 292. Such additional databases, for example, and without limitation, may be included within the enterprise management system program 292 or be remotely connected over a network.

Figure 2A:
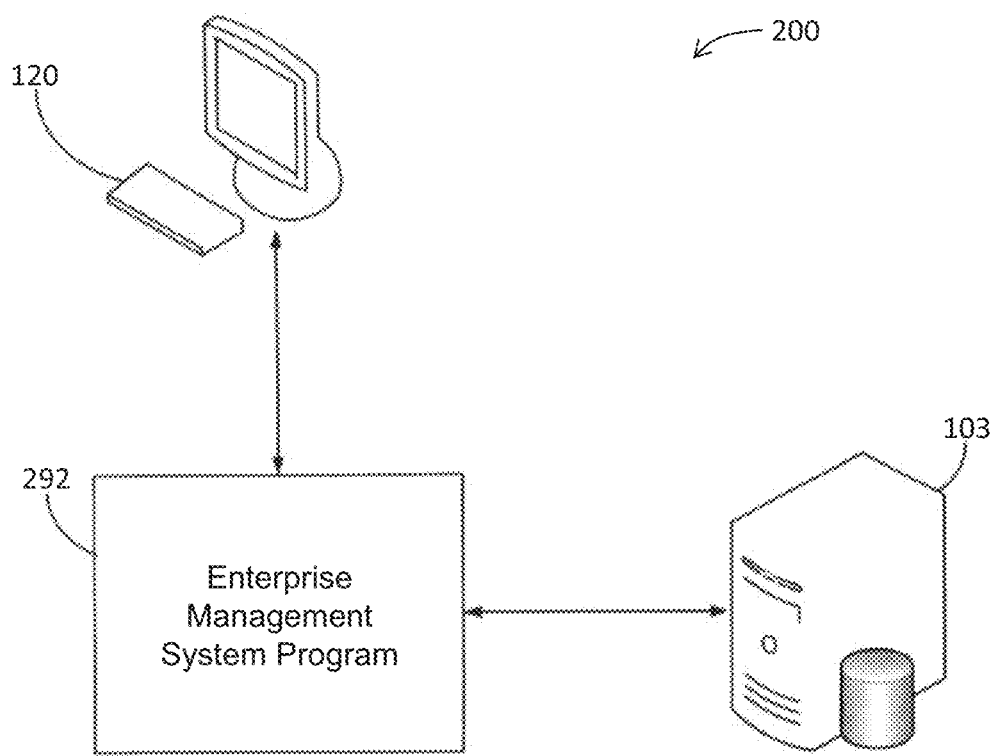
FIG. 2A is a schematic block diagram of a user interface terminal in communication with an enterprise management system program and an associated database according to an embodiment of the present invention.

FIG. 2A illustrates a schematic block diagram of a model user interface terminal 120, through which a stakeholder may interact with an enterprise management system program 292 that has been created by the computer program product 100. The enterprise management system program 292 may interact with a data store 103, such as, for example, and without limitation, an associated database 294. Also for example, and without limitation, the data store 103 may store stakeholder action updates and/or process metrics to be interpreted by the process architects or other interested stakeholders. A person of skill in the art will appreciate that additional databases 103 capable of including and providing access to information may be included with the computer program product 100 of the present invention, and should not view the invention as being limited to the databases listed above.

Figure 3:
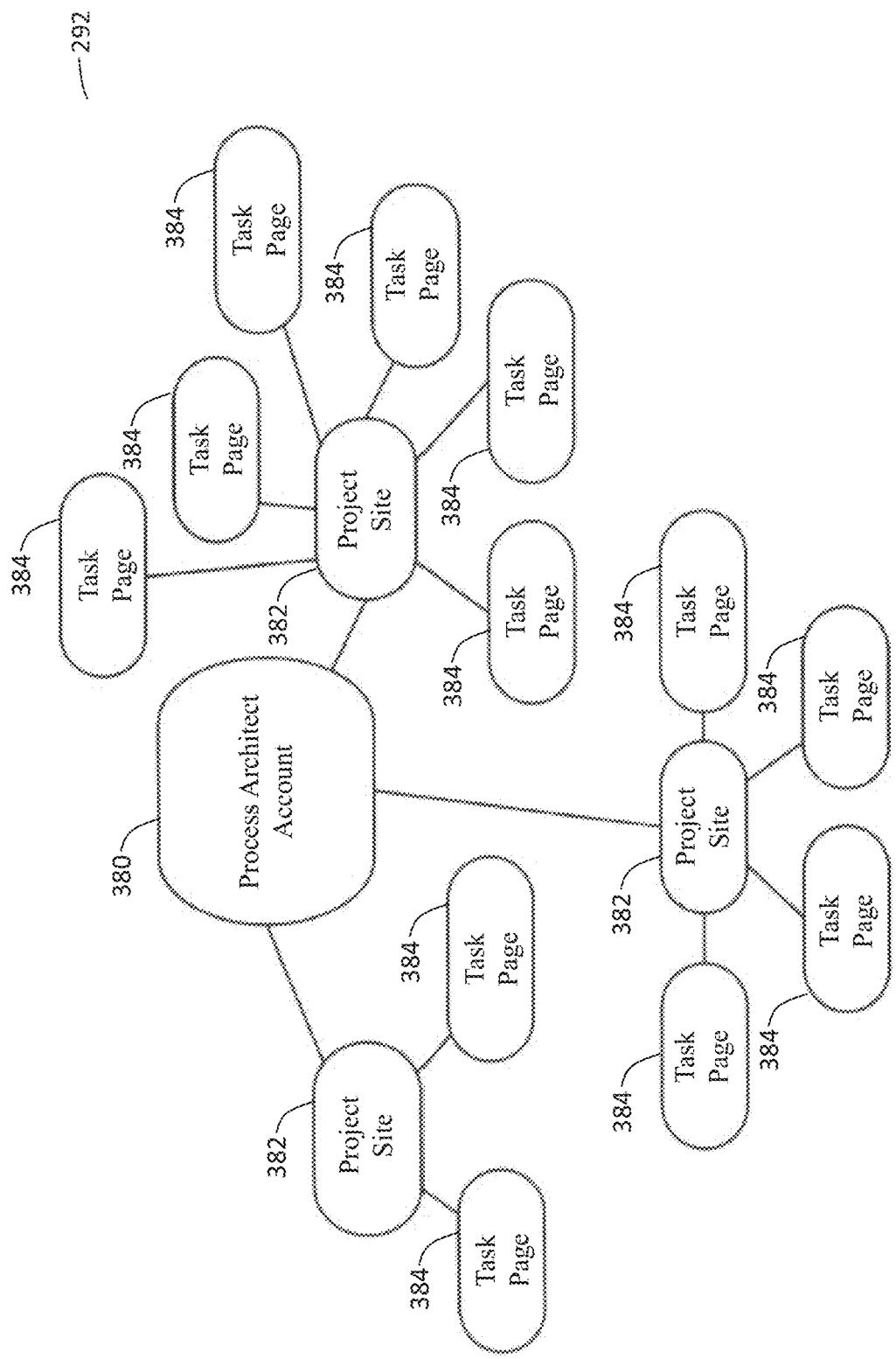
FIG. 3 is a block diagram illustrating a relationship between enterprise management system program levels and a user account according to an embodiment of the present invention.

FIG. 3 illustrates a block diagram for the hierarchical organization of a compiled and built enterprise management system program 292. In the present embodiment, each process architect may register a process architect account 380. The computer program product 100 may build enterprise management system programs 292 for multiple process architect accounts 380. The computer program product 100 may also build multiple enterprise management system programs 292 for a single process architect account 380. A specific and non-limiting example of an enterprise management system program 292 that may be generated by the computer program product 100 described herein may include a business development program (as described below). Each process architect account 380 may be capable of including multiple project sites 382 which may be built into one or more enterprise management system programs 292. A project site 382 may be defined as a collection of actions and/or displays organized as a dashboard and designed to guide stakeholder participation in an enterprise. Similarly, each project site 382 may be comprised of a collection of task pages 284, or, more generally, individual activities presented to a stakeholder for action. For example, and without limitation, the task page 284 may include a specification of one or more activities assigned for attention by one or more stakeholders.

Figure 4:
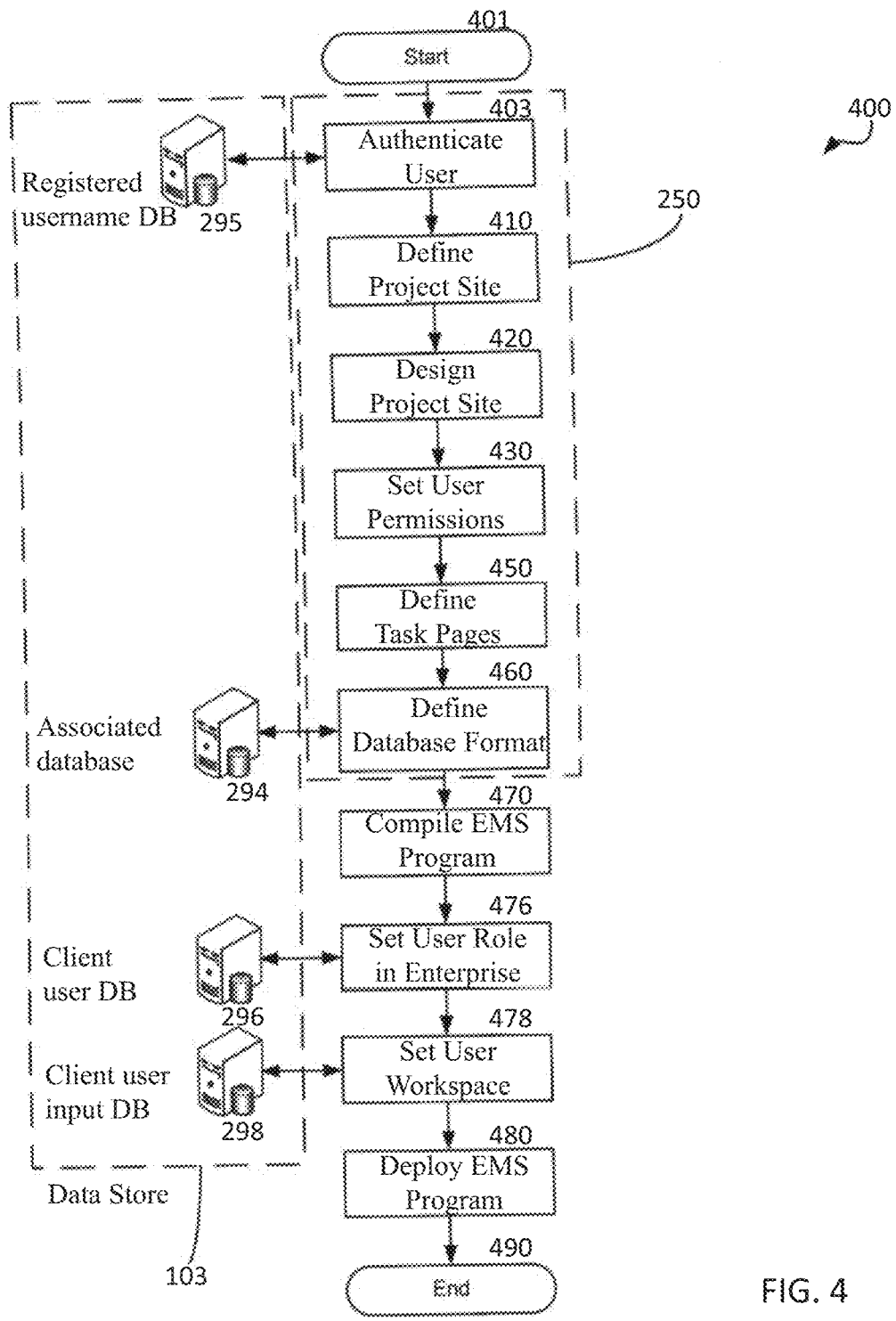
FIG. 4 is a flowchart illustrating the steps performed by a computer program product for creating an enterprise management system program according to an embodiment of the present invention.

FIG. 4 illustrates, as a method aspect of an embodiment of the present invention, an exemplary process of creating a project site 382 through process architect interaction with the computer program product 100, generally. A person of skill in the art will appreciate the following embodiment is not intended to be limiting, and that alternate programming configurations are included within the scope and spirit of the present invention.

Referring to the flowchart 400 of FIG. 4, an illustrative method aspect of the present invention is now described in greater detail. A person of skill in the art will appreciate that the following method aspect is provided in the interest of clarity, and also will appreciate additional method aspects are within the scope of the present invention included in this disclosure.

Starting at Block 401, a user may be authenticated into the system through a user login interface 259 (Block 403), which may be accessed, for example, by a process architect. Through the user login interface 259, the computer program product 100 may compare the credential entered by the process architect with a data store 103, such as the database of registered usernames 295. Next, the process architect may define one or more project sites 382 to be managed by a created enterprise management system program 292. For example, and without limitation, defining a project site 382 may include electing to modify an existing project site 382 that may be selected through the site list interface 252 (Block 410). As further illustrated in the flowchart 400, if the process architect wishes to create a new project site 382, the computer program product 100 may optionally navigate to the page creation interface 254, if a customized design is desired (Block 420). In alternate embodiments, a default site design may be used as a template for creating a new site.

Next, the process architect may choose to set user access permissions through an access control interface 256 (Block 430). For example, and without limitation, the process architect may define one or more stakeholder accounts and data access permissions relating thereto. Also for example, and without limitation, the access control subsystem 160 may present an access control interface 256 that may support self-registration by stakeholders.

After setting user permissions, the process architect may choose to create a task page 384 though the task creation interface 258 (Block 450). The process architect may navigate to the task creation interface 258 to select and/or create the task page 384 (Block 450). For example, and without limitation, the process architect may use the task creation interface 258 to define one or more task pages 384, each of which may include activities which may be presented to a stakeholder to elicit action in support of the enterprise of interest. The process architect may continue to create additional task pages 384 through the task creation interface 258 until the desired number of task pages 384 has been created (Block 450). The format and structure of the data store 103 to be accessed and modified by the enterprise management system program 292, such as, for example, an associated database 294 may next be chosen through the task creation interface 258 (Block 460).

After the project sites 382 and task pages 384 are defined, and after the format and structure of the run-time storage of the data store 103 is chosen, the compiler 160 of the computer program product 100 may build the enterprise management system program 292. As used herein, the term compiler refers to a computer program that transforms some intermediate representation of source code into a form that may be readily executed by a machine. The creation of the enterprise management system (EMS) program 292 may occur through a compiling or building operation (Block 470). For example, and without limitation, the compiler 160 may build a program from information provided by data templates and/or libraries of code, either or both of which may be included with or imported into the computer program product 100 of the present invention. The compiler may build the executable enterprise management system program 292, after which the computer program product 100 may define additional databases, such as a database of stakeholder roles 296 (Block 476) and a stakeholder workspace 298 (Block 478). After completing the compilation and database definition, the generated enterprise management system program 292 may be transferred to a target server through a deployment operation (Block 480). For example, and without limitation, the built enterprise management system program 292 may be downloaded or transferred to an alternate location which may be specified the process architect. The operation of the computer program product 100 may then terminate at Block 490.

Figure 5:
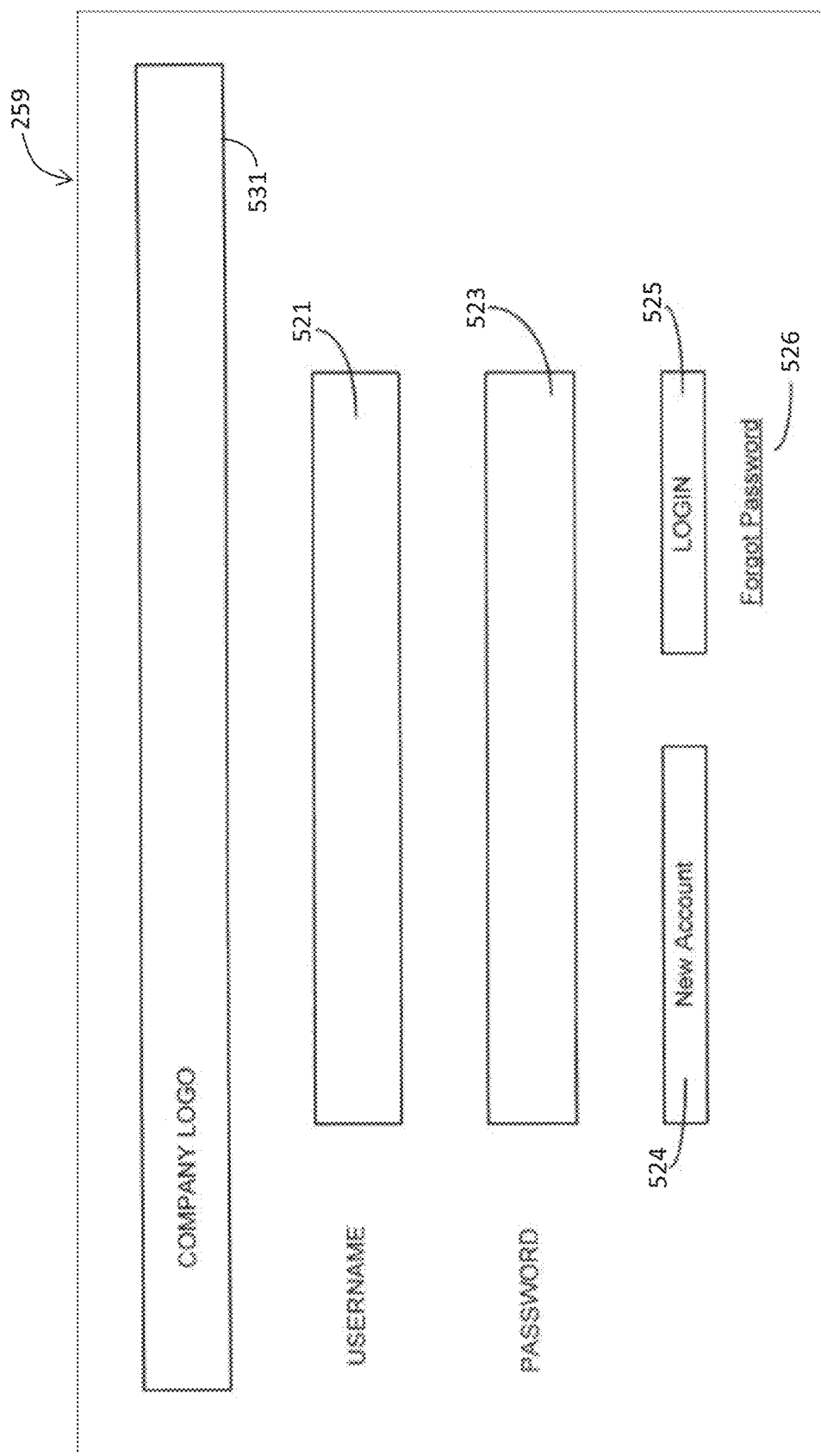
FIG. 5 is a schematic representation of a user login interface of the computer program product according to an embodiment of the present invention.

Referring now to FIG. 5, a schematic representation 259 is provided, in accordance with an embodiment of the present invention, for a model interface for a process architect to interact with the computer program product 100. More specifically, FIG. 5 illustrates a schematic representation of the user login interface 259, according to the present invention. Although the following example interface presents a model structure for interaction with the user login interface 259 of the computer program product 100, a person of skill in the art will appreciate additional related interfaces to be included in this disclosure, with options and features relative to their respective purposes, that allow the interaction between additional design and configuration interfaces of the computer program product 100 and the process architect. Additionally, a person of skill in the art will appreciate alternate functional and stylistic combinations of various fields and components, in addition to the fields and components discussed in the example below, which would be included within the scope and spirit of the present invention.

Figure 8:
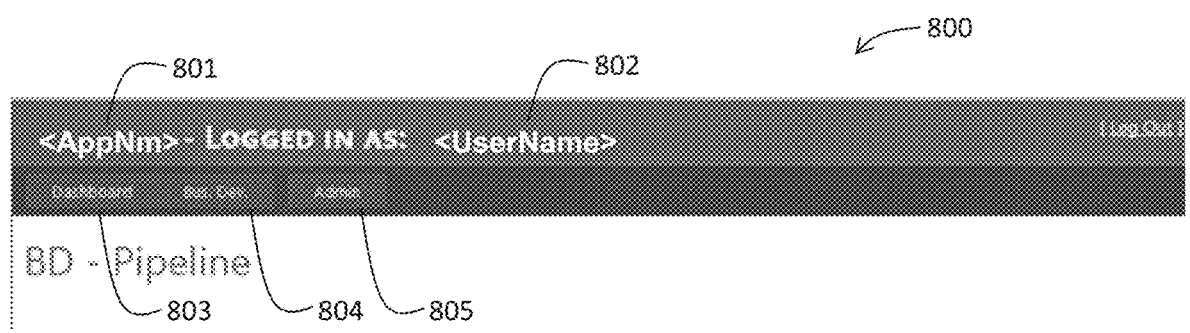
FIGS. 8-11 are schematic representations of exemplary task pages created by a computer program product according to an embodiment of the present invention.

For illustrative purposes, the following example relates to the user login interface 259 which is suitable for display on a monitor 191 (as illustrated in FIG. 8), or other object capable of providing visual feedback. The user login interface 259 may also be suitable for collecting information about the desired login credentials relating to a process architect account 380. The process architect account 380 may include, among a plethora of possible information fields and/or variables, a "username" input field 521, a "password" input field 523, a "new account" button 524, a "login" button 525, and a "forgot password" link 526.

Continuing to refer to FIG. 5, and referring additionally to FIG. 3, additional features of the computer program product 100, according to an embodiment of the present invention, will now be described in greater detail. More specifically, the "username" input field 521 may be provided in the form of a text box, as understood by those having skill in the art. For example, and without limitation, the text box may be capable of taking an input provided by depressing the appropriate keys on a keyboard 162 (as illustrated in FIG. 8) while the input focus is within the "username" input field 521. A "username" input field 521 and a "password" input field 523 may be presented to a process architect to allow the process architect to authenticate the process architect account 380 into the computer program product 100.

After entering credentials within the "username" input field 521 and "password" input field 523, the process architect may click the "login" button 525. Next, the computer program product 100 may preferably compare the submitted credentials with a data store 103, such as, for example, and without limitation, a database of registered usernames 295. If the credentials entered by a user for access to a process architect account 380 match a valid entry in the database of registered usernames 295, the computer program product 100 may proceed to a site list interface 252.

If the database of registered usernames 295 does not contain a process architect account 380 that matches the credentials entered by the process architect into the "username" input field 521 and "password" input field 523, or if the process architect's access has otherwise been restricted, the computer program product 100 may return an error informing the process architect that his or her entry is invalid. In one embodiment, if the process architect has forgotten his or her corresponding password credentials, the process architect may click on the "forgot password" link 526. This action may result in the system electronically transmitting the password database entry via an electronic data transfer protocol, such as, for example, and without limitation, e-mail.

If a process architect desires to create a new process architect account 380, she may click on "new account" button 524. This action may navigate the new process architect to an access control interface 256, which may be configured to allow the process architect to create a process architect account. After the process architect account 380 has been created, the account may be stored in a data store 103, such as the database of registered usernames 295. A company logo 531, for example, or other identifying indicia, may optionally be included in the interface 259.

Figure 6:
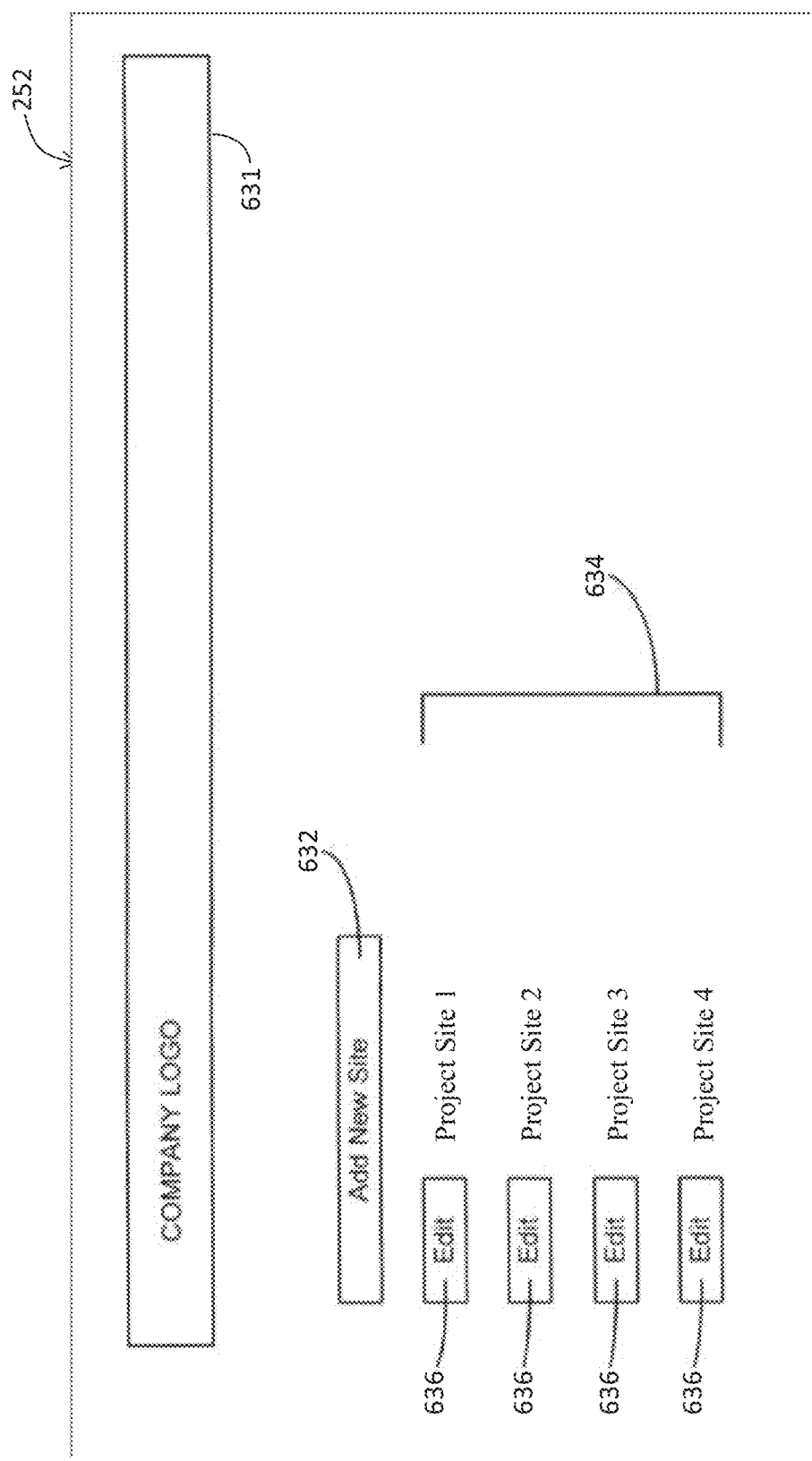
FIG. 6 is a schematic representation of a project site selection interface of the computer program product according to an embodiment of the present invention.

Referring now to FIG. 6, a schematic representation is provided for the site list interface 252 of the computer program product 100 according to an embodiment of the present invention. After the process architect has been properly identified by the user login interface 259, and the corresponding process architect account 380 has been logged into the computer program product 100, the process architect may be directed to the site list interface 252. The site list interface 252 may provide a list of currently available project sites 382. For example, and without limitation, a project site 382 may include a collection of data fields created to define enterprise metrics and required process input.

The process architect may manage one or more project sites 382 through the site list interface 252. For example, and without limitation, the process architect may choose to create a new project site 382 by clicking on the "add new site" button 632. The process architect may also be presented with a list of existing project sites 634. Beside the display for each existing project site 382, a respective "Edit" button 636 may be located to allow the process architect to request to modify each of the project sites 382 and settings associated with an existing project site 382. For example, and without limitation, a process architect may request to edit for purposes of removing a project site 382. A company logo 631 may optionally be included in the interface 252.

Continuing to refer to FIG. 6, and referring additionally to FIG. 4, if the process architect chooses to create a new project site 382, the process architect may be directed to the site design interface 252, where the process architect may select the structure and appearance of the enterprise management system program 292 generated (Block 420). Through the site design interface 252, the process architect may choose to upload a preconfigured site template in a machine-readable format, such as, for example, and without limitation, a cascading style sheet (CSS) or other relevant data format. The process architect may also choose to use a default or preprogrammed formatting structure and design for the project site 382 being designed. The preprogrammed formatting structures may be included locally or in a remotely connected data store 103. Additionally, the preprogrammed formatting structures may be static or updated periodically and/or dynamically. Furthermore, a person of skill in the art will appreciate the use of custom and/or dynamic site templates and formatting structures to be included within the scope of the present invention.

After uploading or configuring the formatting for the project site 382 at Block 420, the process architect may be directed to the access control interface 256. Through the access control interface 256, the process architect may configure settings relating to user access privileges, role-based permissions, user profiles, or other settings related user interaction with the enterprise management system program 292 (see Block 430). A person of skill in the art will appreciate additional configurable settings within the scope and spirit of the present invention.

Figure 7:
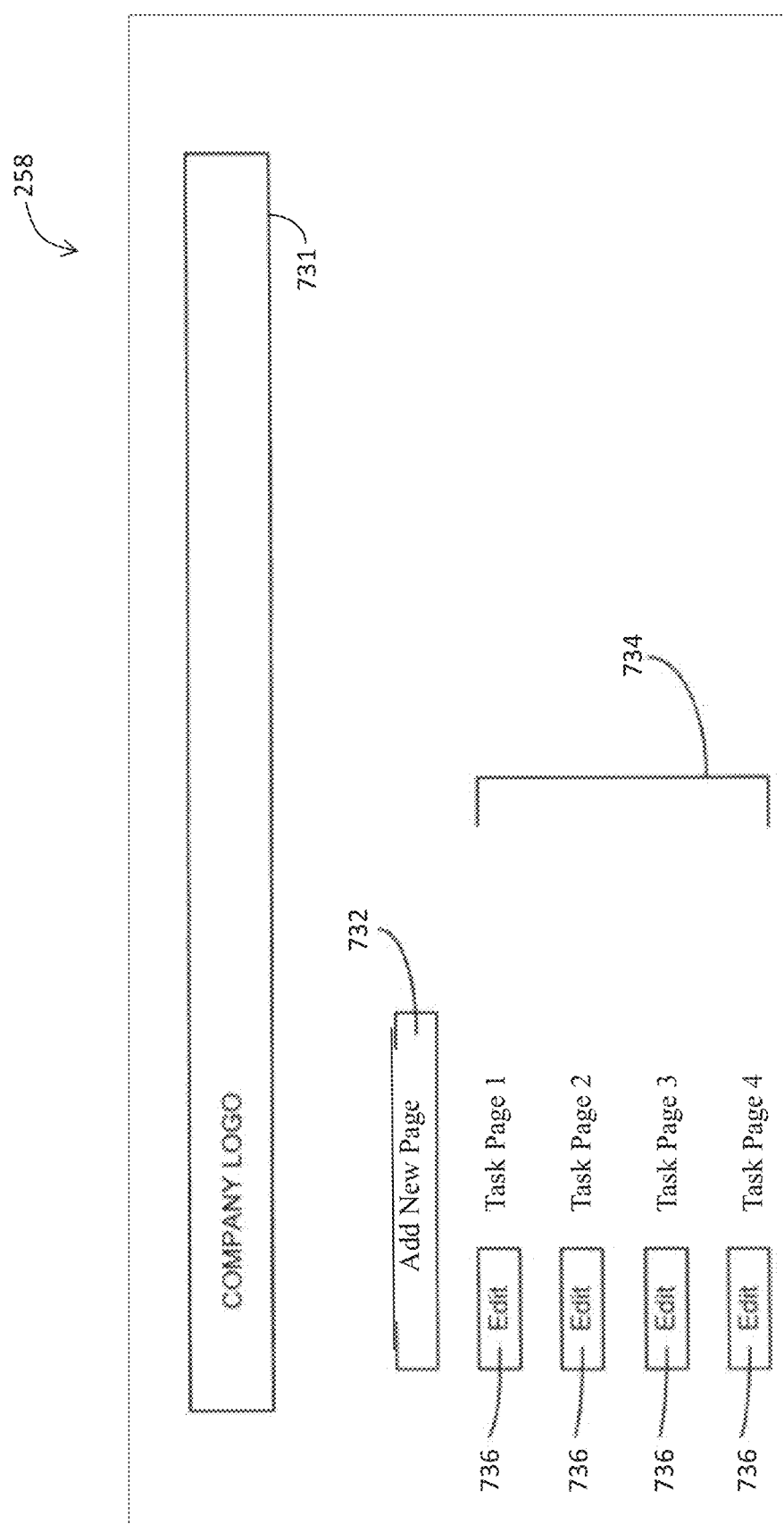
FIG. 7 is a schematic representation of a task page selection interface of the computer program product according to an embodiment of the present invention.

In the present embodiment of the computer program product 100, after the process architect has set up the project site 382 formatting, design, and user interaction parameters, the process architect may be directed to the task creation interface 258. Referring now to FIG. 7, for example, and without limitation, the task creation interface 258 may allow the process architect to modify or create task pages 384 associated with the current project site 382 (see Block 450). To create a new task page 384, the process architect may engage the "add new page" button 732 to navigate the process architect to a task creation interface 258. The process architect may also be presented with a page list 734, which may display existing task pages 384. A page "edit" button 736 may be included adjacent to each existing task page 384 to allow a process architect to modify the content of the task to be presented to the stakeholder including, for example, and without limitation, the method of presentation and data collection.

Continuing to refer to FIG. 7, and referring additionally to FIG. 4, through the task creation interface 258, the process architect may submit one or more task-related artifacts, which may be defined by, for example, and without limitation, a string of text or an image. Also for example, and without limitation, an artifact may comprise a created or uploaded data file, such as a textual document. A person of skill in the art will appreciate additional methods of storing task artifacts entered through the task creation interface 258 may be within the scope and spirit of the present invention.

The process architect may next use the task creation interface 258 to define valid actions a stakeholder may take related to a task-related artifact. A person of skill in the art will appreciate that input received by a task page 382 may not necessarily be valid in the content of an artifact. The process architect may define the valid action, or a desired response, that may relate to one or more tasks through the task creation interface 258. The process architect may optionally navigate to the task creation interface 258, at which the process architect may desire to validate stakeholder input, which may be entered through task creation interface 258, to be categorized as "valid" or otherwise desired input. Input validation may be selectively enabled depending on whether a situation requires input to be validated. For example, and without limitation, input validation may be selectively enabled through the task creation interface 258.

In one embodiment, the process architect may navigate through the task creation interface 258 until the process architect has generated a satisfactory number of task pages 384. A person of skill in the art will appreciate additional or different architectural structures for the task creation interface 258 that may accomplish the same result as the disclosed embodiment to be included in this disclosure. Such differences may include, but are not be limited to, the combination of creation interfaces, the reordering of creation interfaces, or the addition of creation interfaces for customized fields as may be desired by the process architect.

In one embodiment of the method for creating a project site, as illustrated in FIG. 4, a process architect may use the EMCS 100 to automatically generate a tailorable enterprise management system for facilitating execution of a business development process.

Small to mid-sized government contracting companies engaged in the pursuit federal government contracts often have difficulty efficiently managing their business development resources. In the current state of the practice, many contracting companies struggle to discipline their business development enterprises using crude automation such as, for example, spreadsheet or project management software shared from a central source and/or asynchronously updated with input from their business development staffs. The involved staff and management may convene recurring meetings to determine the state of each business development opportunity at a given point in time, and to make decisions regarding process tasks and execution responsibility for those tasks. Communication among the stakeholders in the business development enterprise may be supported by email, text messaging, teleconferences, and personal interactions. Status reporting and plan adjustments may be accomplished on a weekly basis if a contracting company is somewhat organized, and perhaps monthly or even not at all if the contracting company is disorganized.

With federal, state, and local governments shrinking budgets and consolidating contracted projects, a contracting company may realize a competitive edge from even modest improvements in its methods of pursuing contracts. An enterprise architect may propose to create an enterprise-wide computing solution for the contracting company that may enforce process discipline and visibility among all stakeholders in the enterprise. Such a computing solution may advantageously transform an otherwise chaotic, unproductive, and expensive revenue-responsible organization into a streamlined, inter-disciplinary, revenue-generating enterprise capable of filling the contracting company's sales pipeline faster and with more opportunities with the same or lesser amount of staff.

Referring again to FIG. 4, and referring additionally to FIGS. 1, 2, 3, and 6, the process architect may use a user login interface 259 on the process architect client 110 to login to the EMCS 100 (Block 403). More specifically, the Access Control Subsystem 104 may authenticate a credential (e.g., username and password combination) received through the user login interface 259 from the process architect. At Block 410, the process architect may use the Work Flow Modeling Subsystem 106, accessed through the site list interface 252, to add a new project site 632.

At Block 420, the process architect may use the page creation interface 254 to, optionally, assign the newly created project site 632 an application name 801 and to design a representation of the various task categories to be supported within the business development enterprise system to be generated. For example, and without limitation, the process architect may select a toolbar from a set of interface templates that may be retrieved from local storage 294 and/or from available process object sources 140. To model the desired business development enterprise management system, the process architect may use the task creation interface 258 to define an application launch interface 800 (as illustrated in FIG. 8) that may include the toolbar populated with the following task categories: dashboard 803, business development 804, and administration 805.

Figure 9:
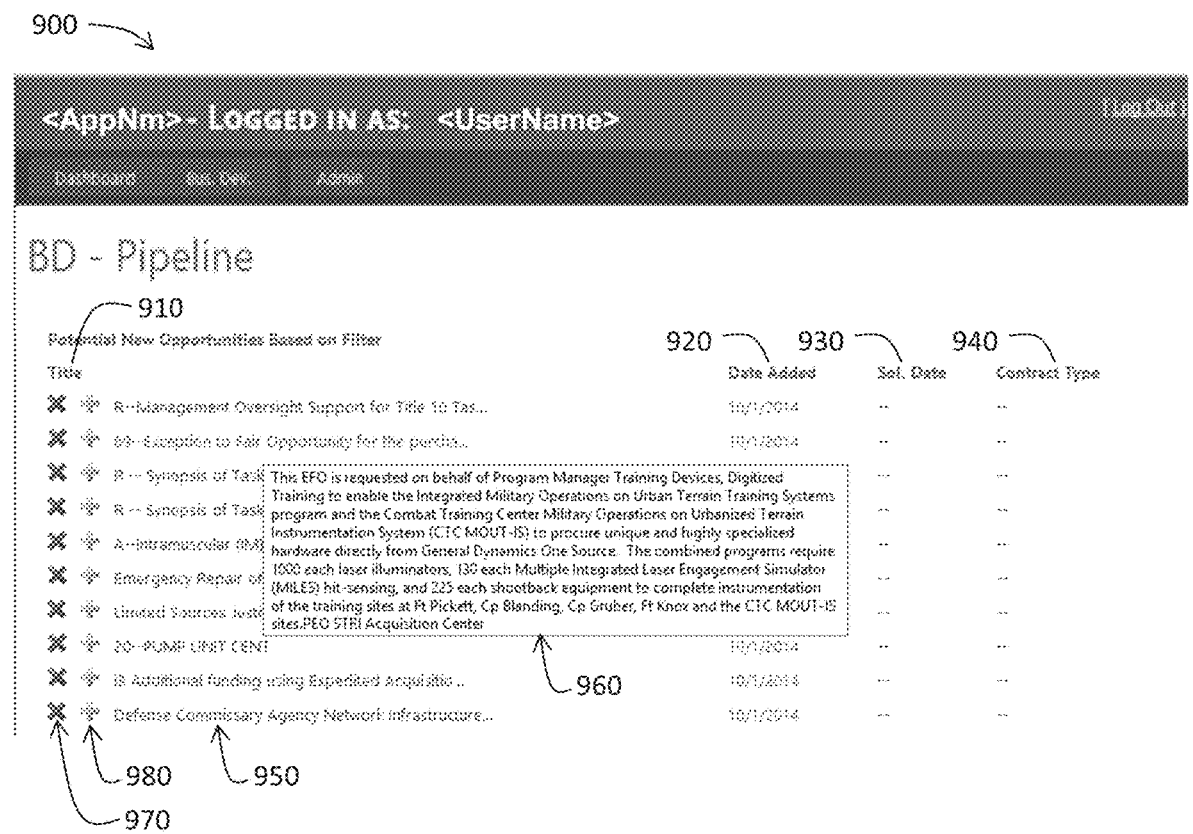

The process architect also may use the task creation interface 258 to further configure the dashboard button 803, when pressed, to activate a dashboard as defined above. Referring now to FIG. 9, the process architect may specify Potential New Business Opportunities to display on a dashboard page 900. For example, and without limitation, Potential New Business Opportunities may be presented on this task page 900 in a list format, and may be configured using one or more of the Access Control, Work Flow Modeling, Data Management, Communication, and Report Management subsystems to provide the following information for each opportunity record on the displayed list:

a) Title 910—This column may show a title assigned to an opportunity by an appropriately-privileged stakeholder.

b) Date Added 920—This column may show a date each opportunity was added to the system by the stakeholder.

c) Solicitation Date 930—This column may show a date each opportunity was processed and given an identifier within the business development enterprise system.

d) Contract Type 940—This column may state each opportunity's contract type.

For example, and without limitation, the process architect may select a set of interface templates retrieved from local storage 294 and/or from available process object sources 140 that may implement the following operations on the Potential New Opportunities dashboard page 900:

1) an active title record 950 which may be clicked to connect the user to the View Opportunity page (as described below).

2) the active title record 950 which may be hovered over to open a box 960 with a description of the opportunity.

3) an 'X' 970 beside each title record 950 which may be clicked to delete the record.

4) a '+' 980 beside each title record 950 which may be clicked to send the item to show expanded detail for the record.

Figure 10:
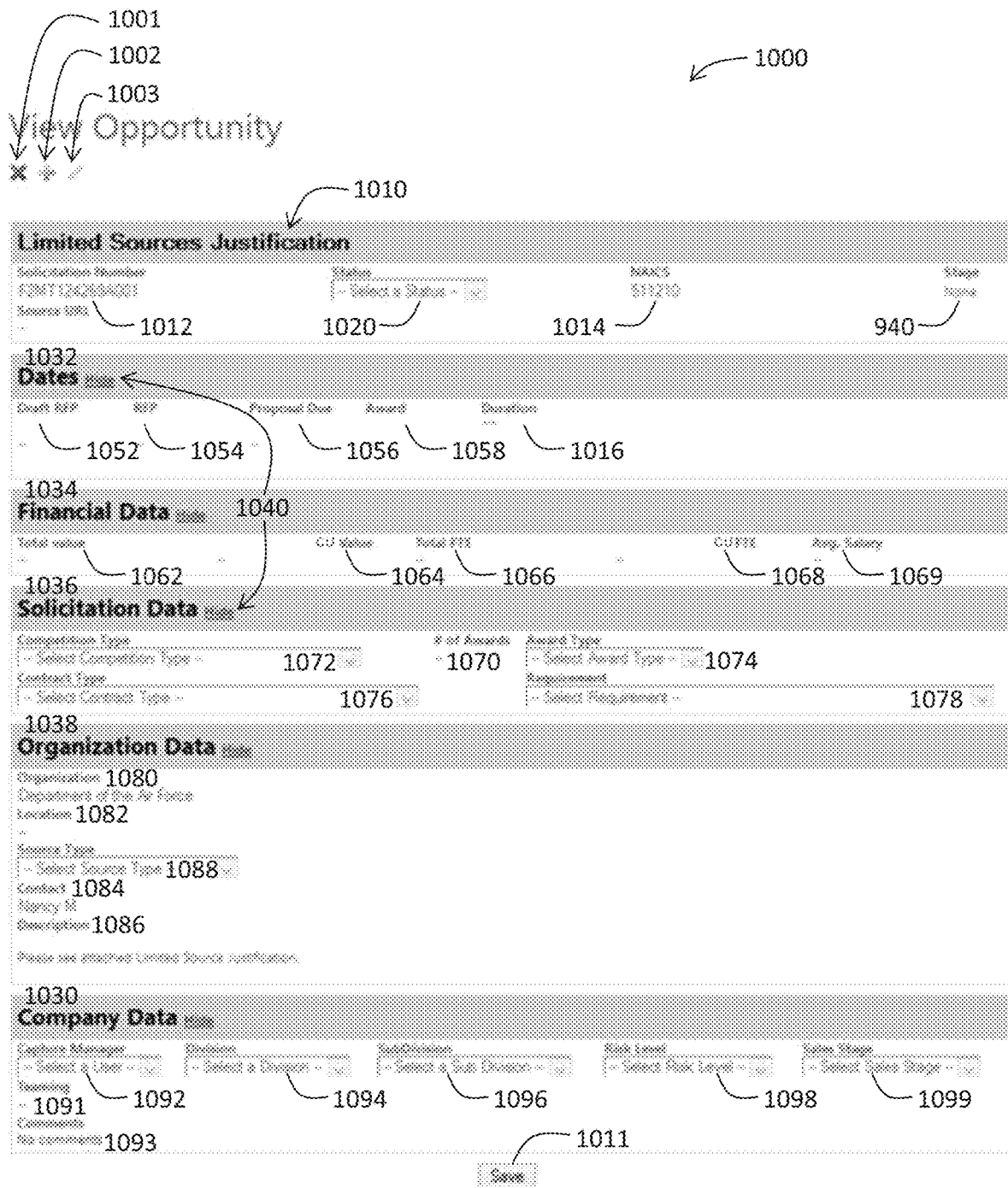

Referring now to FIG. 10, for example, and without limitation, the process architect may select a set of interface templates retrieved from local storage 294 and/or from available process object sources 140 that may implement the following editable fields and operations on the View Opportunity page 1000:

A) an 'X' 1001 at the top of the page which may be clicked to delete the Opportunity record.

B) a '+' 1002 at the top of the page which may be clicked to show expanded detail for the Opportunity record.

C) a pencil icon 1003 at the top of the page which may allow the user to edit the displayed Opportunity.

D) free text boxes which may receive textual input for such system variables as the displayed record Title 1010, Solicitation Number 1012, North American Industry Classification System (NAICS) code 1014, Duration of opportunity 1016, Total Value of opportunity 1062, Contracting Unit Value 1064, Total Full-Time Equivalent (FTE) 1066, Contracting Unit FTE 1068, and Average Salary 1069, Number of Awards 1070, customer Organization 1080, customer Location 1082, customer Contact 1084, opportunity Description 1086, Teaming 1091, and Comments 1093.

E) Dropdown boxes which may receive selectable input for such system variables as opportunity Status 1020. For example, and without limitation, Status may be set by a stakeholder to contracting state such as Awarded, Expired, Post RFP, and Source Selection. Other fields featuring dropdown boxes for receiving input may include Competition Type 1072 (such as Full and Open/Unrestricted, Small Business Set-Aside, and Sole Source), Award Type 1074 (Indefinite Delivery Indefinite Quantity—Agency Specific, Blanket Purchase Agreement, and Single Award), Contract Type 1076 (such as Cost Plus Fixed Fee, Firm Fixed Price, and Time and Materials), Requirement 1078 (such as Administrative and Support Services, Information Technology, and Specialty Trade Contractors), Source Type 1088 (such as Existing Business—Government Prime, New Business—Government Subcontract, and New Business—Government Joint Venture), and Sales Stage 1099 (such as Awaiting Award, Negotiation/Review, Pre-Solicitation, and Proposal), Capture Manager 1092, organization Division/Subdivision 1094, 1096, and Risk Level indicator 1098.

F) Information blocks (for example, and without limitation, one or more of Dates 1032, Financial Data 1034, Solicitation Data 1036, Organization Data 1038, and Company Data 1030), each having a Hide link 1040 that may cause the respective information block's contents to be hidden when clicked, and also a Show link that may allow the information block's content to be seen again when clicked.

G) Calendar pop-ups for date-related fields such as Draft Request For Proposal (RFP) 1052, RFP 1054, Proposal Due 1056, and Award 1058.

H) A Save button 1011 which may be selected by a stakeholder to record any changes made to the page to, for example, and without limitation, one or more of the associated database 294, a client user database 296, and/or a client user input database 298.

Figure 11:
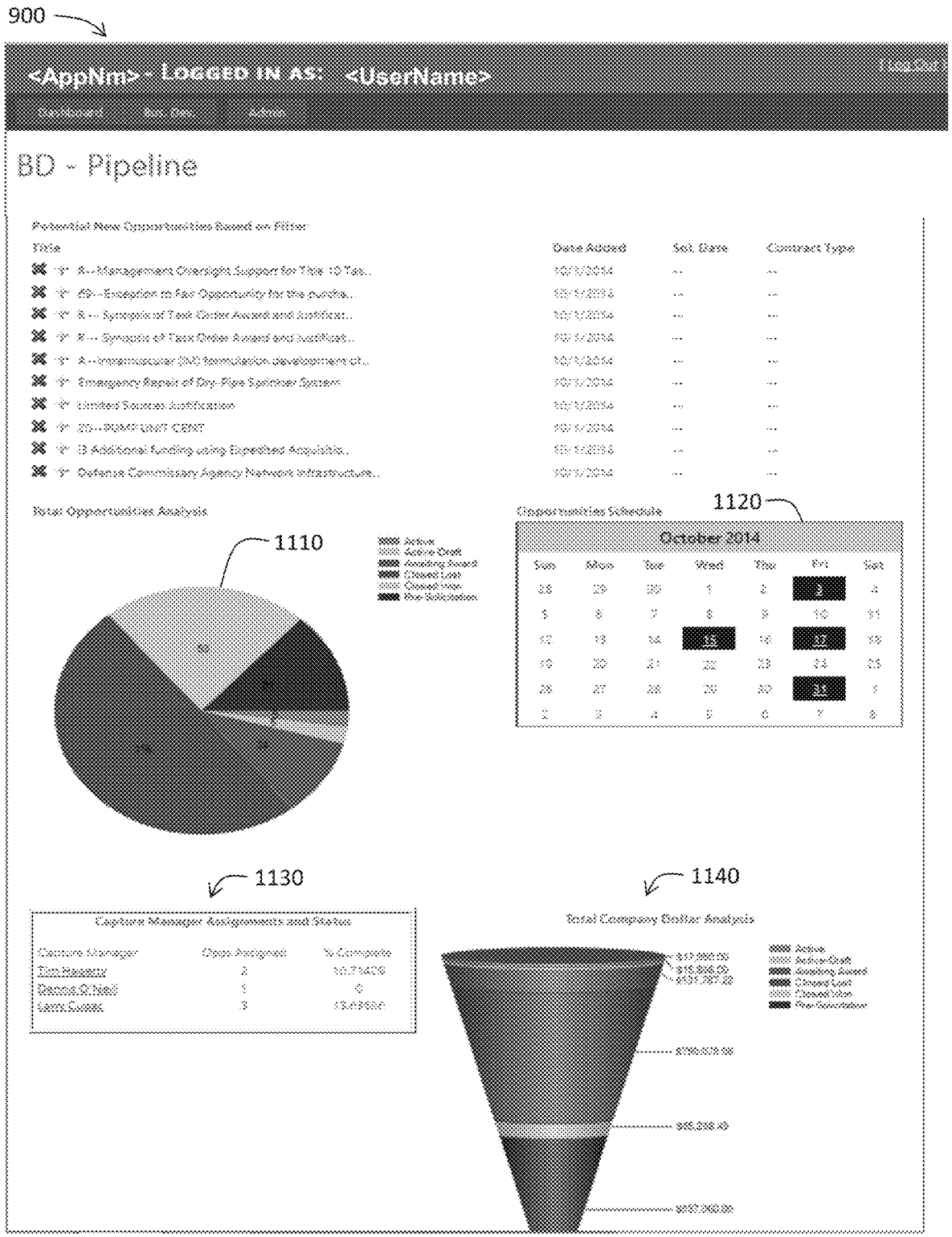

Also, the process architect may specify additional operators to display on the dashboard page 900. For example, and without limitation, the process architect may select a set of interface templates retrieved from local storage 294 and/or from available process object sources 140 that may, as illustrated in FIG. 11, augment the Potential New Business Opportunities 900 presented on a task page with Analyses of the Opportunities (illustrated in FIG. 11 as a pie graph 1110 of the physical number of business opportunities falling within various stages of development), Opportunity Schedules (illustrated in FIG. 11 as a calendar 1120 as showing days in the current month for which business opportunities having due dates are highlighted), Assignments and Status of Capture Managers (illustrated in FIG. 11 as a pick list 1130 of stakeholders assigned a Capture Manager role, along with the number of business opportunities each is assigned and the percentage of opportunities completed overall), and/or Total Company Dollar Analyses (illustrated in FIG. 11 in a cone format 1140 that may provide an at-a-glance analysis of the financial benefits business opportunities may give a contracting company, with the dollar amounts separated within various categories).

As described above, the process architect may continue to create additional task pages 384 for the business development enterprise system, through the task creation interface 258, until a functionally-complete set of task pages 384 has been created (Block 450) that accounts for all of the enterprise activities modeled by the process architect. The format and structure of the data store 103 to be accessed and modified by the business development enterprise system 292, such as, for example, an associated database 294 may next be chosen through the task creation interface 258 (Block 460).

Continuing to refer to FIG. 4, at Block 430, the process architect may use the Access Control Subsystem 104 through the access control interface 256 to define user accounts for various stakeholders who may require access to the generated enterprise management system program 292 in order to participate in the enterprise. For example, and without limitation, the process architect may use the access control interface 256 to assign and save to the registered username database 295 a unique combination of Username, Password, and Company Identifier to each stakeholder to be used as a three-part login to gain access to the enterprise management system program 292.

At Block 476, the process architect may use the access control interface 256 to define one or more roles that may be modeled after the positions that various stakeholders may hold in the business development enterprise. For example, and without limitation, the particular role assigned to a user (e.g., company CEO, business development staff, Capture Manager, proposal writers) in the access control interface 256 may dictate which pages and/or tasks within the enterprise management system program 292 each user may be allowed to access.

User roles may be useful in providing each stakeholder productivity-enhancing access to various task pages, and/or to individual features present on those various task pages, on a need-to-know basis.

For example, and without limitation, the process architect may use the Data Management Subsystem 106, through the task creation interface 258, to isolate sensitive or confidential information (e.g., stakeholder salaries) to associated databases 294 that may represent secure storage. Also for example, and without limitation, the process architect may use the Data Management Subsystem 106, through the task creation interface 258, to leverage data sources 130, 140 that may be external to the process architecture server 101.

Also for example, and without limitation, the process architect may use the Communication Subsystem 107, through the task creation interface 258, to facilitate controlled lines of communication between shareholders having responsibility for inter-related tasks in the workflow defined by the process architect Also for example, and without limitation, the process architect may use the Communication Subsystem 107, through the task creation interface 258, to capture a recorded history of business development project communications for audit and/or quality control purposes.

Also for example, and without limitation, the process architect may use the Report Management Subsystem 108, through the task creation interface 258, to produce business development project reports tailored to the requirements of particular stakeholders (e.g., CEO, Capture Managers, sales staff). Also for example, and without limitation, the process architect may use the Report Management Subsystem 108, through the task creation interface 258, to limit visibility to various reports based on need-to-know.

Figure 12:
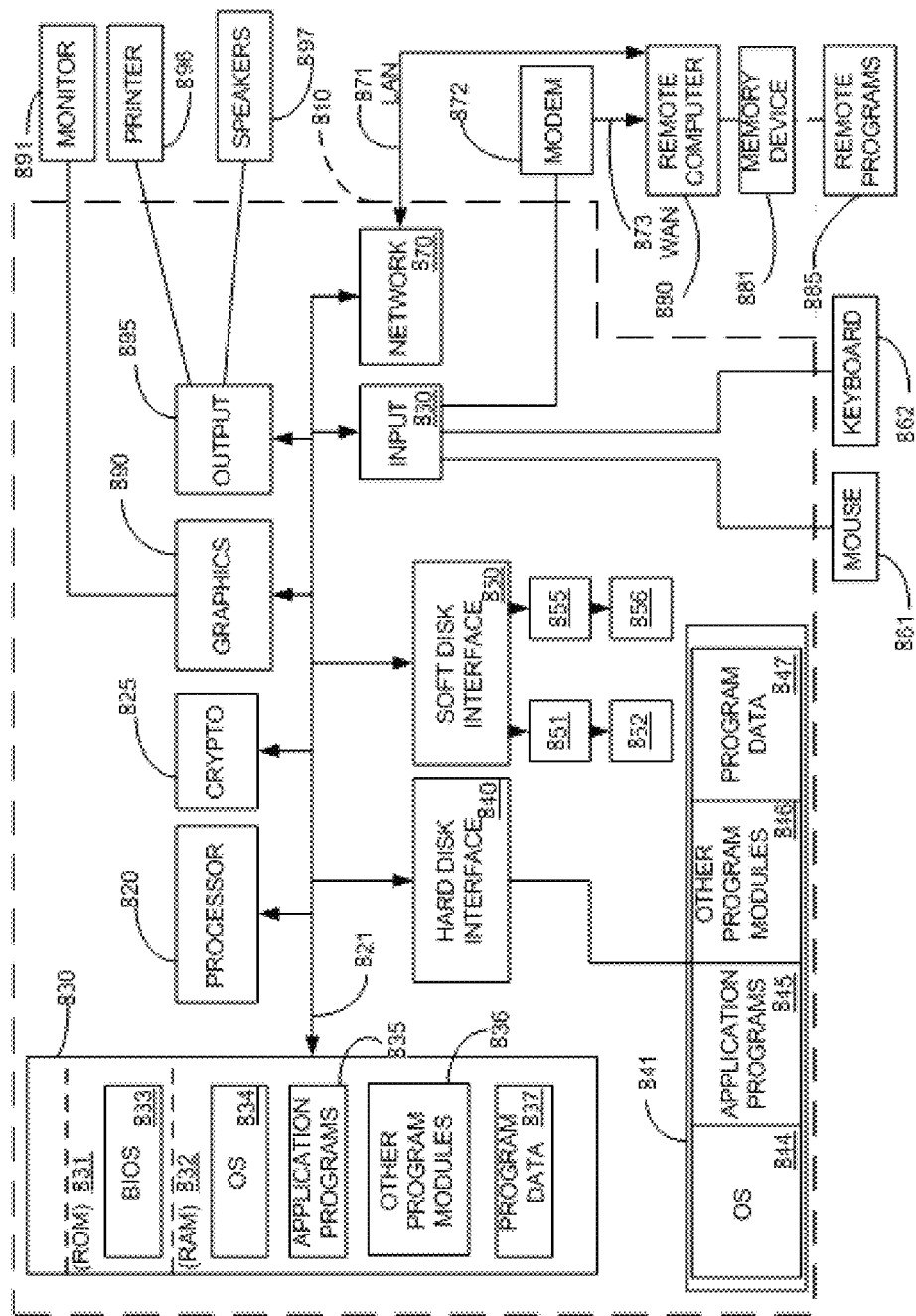
FIG. 12 is a block diagram representation of a machine in the example form of a computer system according to an embodiment of the present invention

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 12 illustrates a model computing device in the form of a computer 810, which is capable of performing one or more computer-implemented steps in practicing the method aspects of the present invention. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 810 may also include a cryptographic unit 825. Briefly, the cryptographic unit 825 has a calculation function that may be used to verify digital signatures, calculate hashes, digitally sign hash values, and encrypt or decrypt data. The cryptographic unit 825 may also have a protected memory for storing keys and other secret data. In other embodiments, the functions of the cryptographic unit may be instantiated in software and run via the operating system.

A computer 810 typically includes a variety of computer readable media. Computer readable media can be any available media that can be accessed by a computer 810 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates an operating system (OS) 834, application programs 835, other program modules 836, and program data 837.

The computer 810 may also include other removable/non-removable, volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives, and their associated computer storage media discussed above and illustrated in FIG. 12, provide storage of computer readable instructions, data structures, program modules and other data for the computer 810. In FIG. 12, for example, hard disk drive 841 is illustrated as storing an OS 844, application programs 845, other program modules 846, and program data 847. Note that these components can either be the same as or different from OS 833, application programs 833, other program modules 836, and program data 837. The OS 844, application programs 845, other program modules 846, and program data 847 are given different numbers here to illustrate that, at a minimum, they may be different copies. A user may enter commands and information into the computer 810 through input devices such as a keyboard 862 and cursor control device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a graphics controller 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 12. The logical connections depicted in FIG. 12 include a local area network (LAN) 871 and a wide area network (WAN) 873, but may also include other networks 140. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on memory device 881.

The communications connections 870 and 872 allow the device to communicate with other devices. The communications connections 870 and 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Many modifications and other embodiments of the invention will come to the mind of one skilled in the art having the benefit of the teachings presented in the foregoing descriptions and the associated drawings. Thus the scope of the invention should be determined by the appended claims and their legal equivalents, and not by the examples given.

That which is claimed is:

1. An enterprise management network comprising:
a process architect client configured to receive a plurality of configuration dashboard data stores from a process architecture server, provide a graphical representation based on data contained in the plurality of configuration dashboard data stores, provide a data store to a process architecture server to configure an enterprise management system model comprising a project site and a task page associated with the project site, and operate a work flow modeling subsystem to create the enterprise management system model using third-party process content received from a process object server;
the process object server, comprising a third-party government contract management system configured to obtain a plurality of process objects and provide the plurality of process objects to the process architecture server, wherein each of the plurality of process objects:
are further classified as one of
a project process object comprising a title, a summary of an objective, a monetary budget, a human resource budget, and a duration of execution,
a task process object comprising a name, a summary description of an activity to be carried out, a defined start date, and a defined end date,
an artifact process object comprising a digital file characterized by a file name, a file type, and a version identifier,
a stakeholder process object comprising a unique identifier, an indicator of stakeholder role, and an identification handle;
a stakeholder client configured to provide a task status to the process architecture server, receive a plurality of task dashboard data stores from the process architecture server, and provide a graphical task representation based on data contained in the plurality of task dashboard data stores; and
the process architecture server in data communication with the process architect client, the process object server, and the stakeholder client, wherein the process architecture server comprises:
an access control subsystem configured to create and enforce role-based access control definition data and functions related to a generated project,
the work flow modeling subsystem configured to model processes including definition of tasks, responsible parties, execution timelines, and project milestones of the generated project and configured to define process metrics to be collected during execution of a modeled work flow,
a data management subsystem configured to define data input sources and data output destinations,
a communication subsystem configured to define communication protocols, define protocols for stakeholders to interact with the generated system in a trusted manner, and define data security mechanisms, and
a report management subsystem configured to define format and content for reports.

2. The enterprise management network according to claim 1 wherein the access control subsystem is further configured to receive an access request, match the access request to a part of the role-base access control definition data defined as a process architect registration, and operate at least one of the work flow modeling, data management, communication, and report management subsystems to include enforcing role-based permissions associated with the process architect registration.

3. The enterprise management network according to claim 1 wherein the process architecture client is further configured to operate the work flow modeling subsystem to create the enterprise management system model using at least one of an interface template and a report template.

4. The enterprise management network according to claim 1 wherein the access control subsystem is further configured to receive an access request, to match the access request to a stakeholder registration, and to enforce role-based permissions associated with the stakeholder registration.

5. The enterprise management network according to claim 1 wherein the stakeholder client is configured to create the plurality of process objects.

6. The enterprise management network according to claim 5 wherein the plurality of task dashboard data stores are further configured to collect a process metric, as defined in a process model definition data, related to one of the plurality of process objects.

7. A method for creating a centralized enterprise management network using a process architect client, a process object server comprising a third-party government contract management system configured to obtain a first plurality of data stores and provide the first plurality of data stores to a process architecture server, wherein each of the first plurality of data stores are further classified as one of a project process data store comprising a title, a summary of an objective, a monetary budget, a human resource budget, and a duration of execution, a task data store comprising a name, a summary description of an activity to be carried out, a defined start date, and a defined end date, an artifact process data store comprising a digital file characterized by a file name, a file type, and a version identifier, or a stakeholder process data store comprising a unique identifier, an indicator of stakeholder role, and an identification handle, a stakeholder client, and the process architecture server comprising a plurality of subsystems including an access control subsystem, a work flow modeling subsystem, a data management subsystem, a communication subsystem, and a report management subsystem, wherein the process architecture client, the process object server, and the stakeholder client are in data communication with the process architecture server via a network, wherein each of the plurality of subsystems comprises a respective interface to manipulate information included in a data store of the process architecture server, the method comprising:

receiving, using a network interface of the process architecture server, a second plurality of data stores from the process architect client;

providing, using the network interface, the data of the second plurality of data stores to the access control subsystem, the work flow modeling subsystem, the data management subsystem, the communication subsystem, or the report management subsystem;

receiving, using the network interface, the plurality of process data stores from the process object server;

providing, using the network interface, the data of the plurality of process data stores to the access control subsystem, the work flow modeling subsystem, the data management subsystem, the communication subsystem, or the report management subsystem;

receiving, using the network interface, data from the access control subsystem, the work flow modeling subsystem, the data management subsystem, the communication subsystem, or the report management subsystem;

storing the data in one of a plurality of configuration dashboard data stores;

providing, using the network interface, the plurality of configuration dashboard data stores to the process architect client;

receiving, using the network interface, a third plurality of data stores from the stakeholder client;

providing, using the network interface, the data of the third plurality of data stores to the access control subsystem, the work flow modeling subsystem, the data management subsystem, the communication subsystem, or the report management subsystem;

receiving, using the network interface, data from the access control subsystem, the work flow modeling subsystem, the data management subsystem, the communication subsystem, or the report management subsystem;

storing the data in one of a plurality of task dashboard data stores;

providing, using the network interface, the plurality of task dashboard data stores to the stakeholder client;

creating, using the access control subsystem, role-based access control definition data and functions related to generated enterprise dashboard designs based on the data received from the network interface;

enforcing, using the access control subsystem, the role-based access control definition data and functions related to generated enterprise dashboard designs based on the data received from a network interface;

modeling, using the work flow modeling subsystem, processes including definition of tasks, responsible parties, execution timelines, and project milestones based on the data received from the network interface;

defining, using the work flow modeling subsystem, process metrics to be collected during execution of a modeled work flow based on the data received from the network interface;

defining, using the data management subsystem, data input sources and data output destinations based on the data received from the network interface;

defining, using the communication subsystem, communication protocols;

defining, using the communication subsystem, protocols for stakeholders to interact with the generated system in a trusted manner;

defining, using the communication subsystem, data security mechanisms in accordance with the data received from the network interface; and defining, using the report management subsystem, format and content for reports based on the data received from the network interface.

8. The method according to claim 7 wherein the method further comprises:

receiving, using the access control subsystem, an access request;

matching, using the access control subsystem, the access request to a part of the role-base access control definition data defined as a process architect registration; and operating at least one of the access control, work flow modeling, data management, communication, and report subsystems to include enforcing, using the access control subsystem, role-based permissions associated with the process architect registration.

9. The method according to claim 7 further comprising:

operating, using the process architecture client, the work flow modeling subsystem to create an enterprise management system model comprising a project site and a task page associated with the project site.

10. The method according to claim 7 wherein the method further comprises:

operating, using the process architecture client, the work flow modeling subsystem to create the enterprise management system model to include at least one of an interface template and a report template.

11. The method according to claim 7 wherein the method further comprises:

receiving, using the access control subsystem, an access request;

matching, using the access control subsystem, the access request to a part of the role-base access control definition data defined as a stakeholder registration; and enforcing, using the access control subsystem, role-based permissions associated with the stakeholder registration.

12. The method according to claim 7 further comprising:

creating, using the stakeholder client, the process object.

13. The method according to claim 7 wherein the method further comprises collecting a process metric, as defined in a process model definition data, related to the process object.

* * * * *